S. D. MURRAY.
COMBINED FILLER AND PACKER FOR BALING PRESSES.
APPLICATION FILED FEB. 10, 1915.

1,193,410.

Patented Aug. 1, 1916.
4 SHEETS—SHEET 2.

S. D. MURRAY.
COMBINED FILLER AND PACKER FOR BALING PRESSES.
APPLICATION FILED FEB. 10, 1915.

1,193,410.

Patented Aug. 1, 1916.
4 SHEETS—SHEET 4.

Witnesses:

Inventor
Stephen D. Murray,
by
Attorney.

UNITED STATES PATENT OFFICE.

STEPHEN D. MURRAY, OF DALLAS, TEXAS.

COMBINED FILLER AND PACKER FOR BALING-PRESSES.

1,193,410.  Specification of Letters Patent.  Patented Aug. 1, 1916.

Application filed February 10, 1915. Serial No. 7,346.

*To all whom it may concern:*

Be it known that I, STEPHEN D. MURRAY, a citizen of the United States, residing at Dallas, in the county of Dallas and State of Texas, have invented new and useful Improvements in Combined Fillers and Packers for Baling-Presses, of which the following is a specification.

This invention relates to a combined filler and packer for association with a cotton press or baling apparatus and operating to receive lint cotton from a suitable source and deliver and pack it into a baling box preparatory to pressing the cotton into bales.

The primary object of the invention is to facilitate the introduction of lint cotton within a baling box through the medium of a novel arrangement of feed rollers disposed in operative relation to a receiving and accumulating chamber of a cotton separator and in part exposed through the upper portion of the wall of the baling apparatus without intermediary space between the said part of the baling apparatus and the rollers so as to insure a direct feed into said apparatus when the packer foot or platen is raised or elevated, the rollers being automatically checked in their feeding operation at the time the packer foot or platen is descending into the baling box and until it reaches its full elevation.

In the present instance a group of feed rollers is arranged within the outlet of a receiving and accumulating chamber of a cotton separator and practically occupies the full space of the lower extremity of the chamber and its outlet, so that the cotton cannot pass below the rollers, and a positive egress of the cotton, which is deposited above the rollers, ensues from the said chamber of the separator when the rollers are active. The axes of the rollers are preferably angularly disposed relatively to each other, or two of the rollers are so disposed relatively to the third roller that the bite of the said two rollers is directly exposed to the mass of lint cotton falling upon and which may accumulate thereon that the cotton is regularly drawn between the said two rollers, when active, and then passes between one of the said rollers and the third roller and is directly delivered from the last named two rollers into the baling apparatus below the packer foot or platen. In view of this arrangement of the feed rollers it is impossible to choke the feed of the cotton from the separator chamber to the baling apparatus adjacent thereto.

The improved filler and packer also embodies automatically operating means for throwing the plunger of the packer foot or platen out of driving connection with relation to the driving mechanism when the said foot or platen reaches its maximum elevation, and for maintaining the plunger and foot inoperative so long as the feed rollers of the cotton separator coöperating with the baling apparatus are delivering a predetermined quantity of cotton in said apparatus when the plunger and platen or foot are caused to immediately descend to pack the cotton fed into the baling apparatus. The feed rollers are stopped when the packer platen or foot starts to descend and remain inactive until a full stroke of the platen or foot ensues, and when the platen or foot rises to its full height the rollers are again automatically operated to feed the cotton from the separator. The packer plunger and platen or foot are also checked instantly when they rise to their maximum height by a braking attachment, which also operates to dispose the operating mechanism for the plunger and platen or foot to the best advantage for subsequent automatic operation of the plunger and platen or foot. All of these operations are regularly carried on after the mechanism is started without the least manual attention or operation.

From the foregoing the essential features of the invention will be disclosed and understood as being a separator or condenser having a lint cotton receiving and accumulating chamber provided with an outlet with feeding means associated therewith, a packer platen or foot movable adjacent to said feeding means, and automatically operating mechanism for intermittently and alternately operating the feeding means and packer whereby when the packer platen or foot is acting the lint cotton will be temporarily stored in the said chamber.

Other novel features, objects and advantages will be hereinafter specified in connection with the preferred structural organization of the mechanism embodied in the complete filler and packer, and in the accompanying drawings one practical embodiment of a combined filler and packer comprising the features of the present invention is illustrated, and in the drawings.

Figure 1:
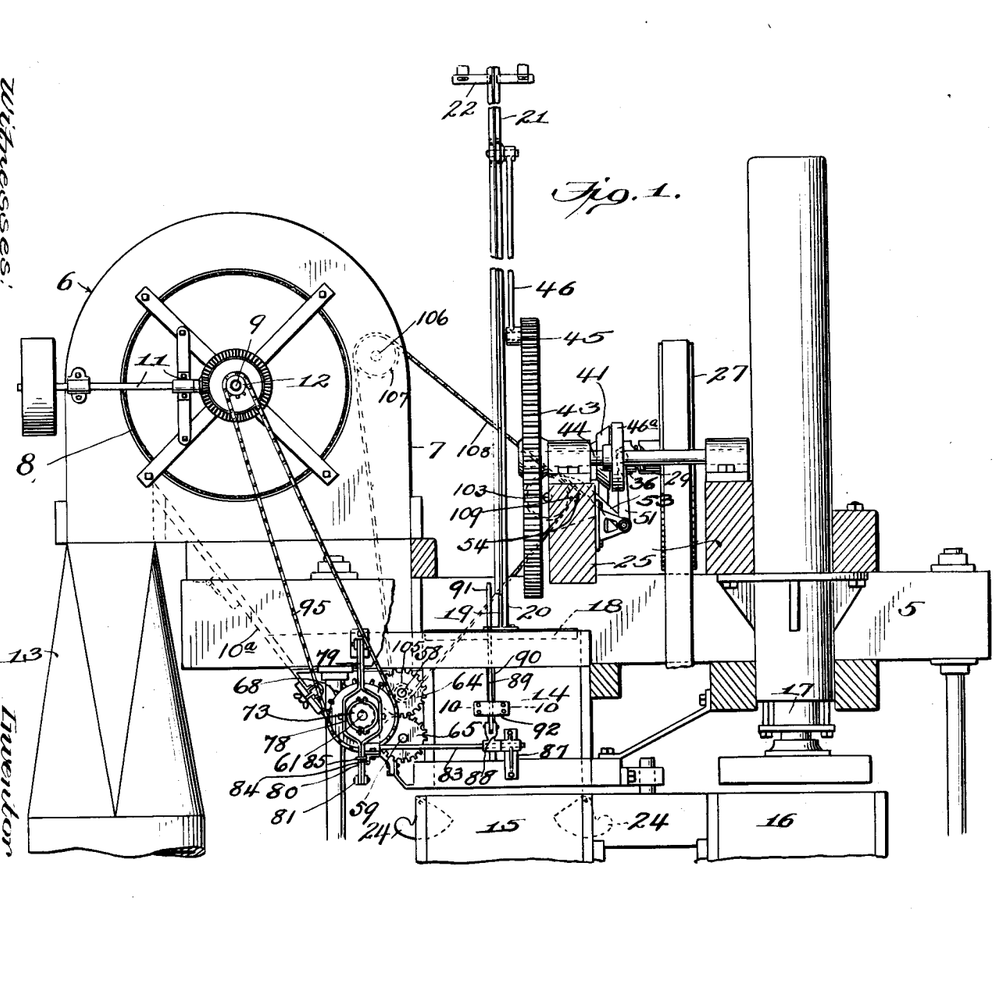
Figure 1 is a sectional elevation of a filler and packer embodying the features of the invention and also showing portions of a double baling box organization.
Figure 3:
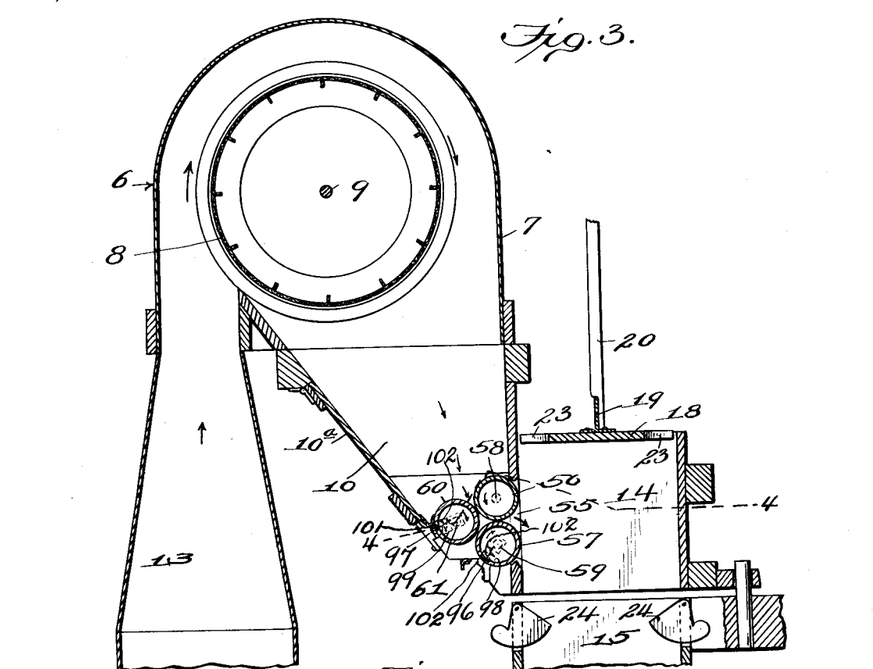
Fig. 3 is a vertical section through a portion of the baling apparatus and the separator or condenser particularly showing the outlet chamber of the separator or condenser and the feeding rollers, and the relation of the latter to each other, the said chamber and the one wall of the adjacent portion of the baling apparatus.

The numeral 5 designates the supporting frame including suitable longitudinal and cross timbers and braces and other reinforcing devices upon which the parts of the machine are mounted and arranged to relatively and operatively support the parts hereinafter specified. A part of the timbers at one extremity has thereon a separator or condenser 6 embodying a sheet metal wall 7, a foraminous cylinder 8 having a shaft 9, and a lower cotton receiving chamber 10 which depends at the inner portion of the separator and has a hinged door 10ª with a suitable catch means for giving access thereto. The shaft 9 has the usual driving mechanism 11 coöperating therewith, and on one end of said shaft is a sprocket wheel 12. The upper delivery end of a lint flue 13 extends from a suitable battery of gins and is connected to and communicates with the separator, as shown by Fig. 1, said flue being adapted to feed lint cotton into the separator from the gins. After the cotton is centrifugally thrown around the foraminous cylinder 8 in the direction of the arrows as shown by Fig. 3, to subject the same to the usual treatment of separators, it falls into the chamber 10 below and is fed at intervals therefrom by means which will be presently explained and passes into a delivery chamber 14 forming part of the baling apparatus and arranged over a baling box 15, preferably one box of the ordinary double box baling press comprising a second box 16, the boxes 15 and 16 after having predetermined quantities of cotton alternately packed therein swinging under a baling plunger or ram 1' of a well known type. The boxes 15 and 16 alternately swing under and register with the delivery chamber 14 and the packer mechanism.

A packer foot or platen 18 is mounted to vertically reciprocate through the delivery chamber 14 and into the bale boxes 15 and 16, and extending thereover and fixed there on is a flanged iron 19 having converging flanged iron uprights 20 secured thereto on opposite sides of the center of the foot or platen and extending upwardly and secured to a similarly flanged iron 21 moving in guide 22 at a suitable elevation. The uprights 20 and iron 21 constitute the plunger which by the construction thereof as just explained insures a positive reciprocation of the foot or platen 18 in an invariable horizontal plane and with an equal pressure force throughout its entire bottom area. The foot or platen has slots 23 in its opposite side edges to permit it to readily pass upwardly over or clear the usual retaining dogs 24 in the baling boxes and which have a function well understood in the art.

Figures 8, 10:
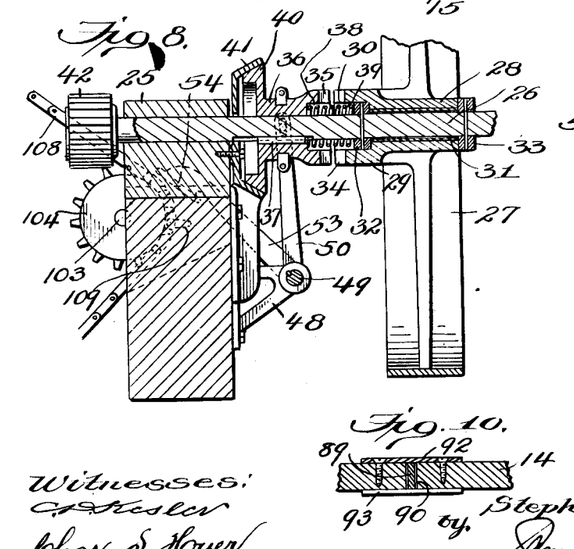
Fig. 8 is an enlarged detail section taken in the plane of the line 8—8, Fig. 2.
Fig. 10 is a detail horizontal section showing the manner of mounting the means for operating the clutch of the feed rollers, and taken on the line 10—10, Fig. 1.
Figure 9:
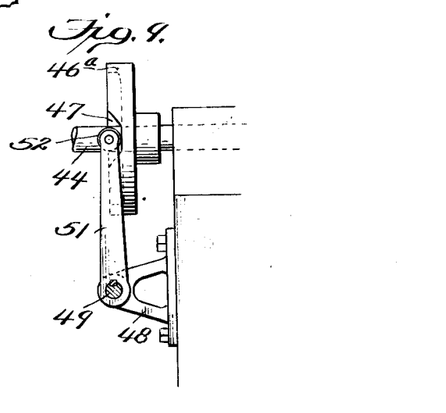
Fig. 9 is a detail elevation particularly showing the face cam and roller arm for holding the packer plunger and foot or platen inoperative at intervals.

On one extremity of cross timbers forming part of the frame 5, a pinion shaft 26 is mounted in suitable bearings and provided with a loose drive pulley 27 belted to a suitable power source, the pulley having an elongated hub 28 which has one end 29 projected and formed with a chamber; see Fig. 8. The hub 28 engages a bushing sleeve 31 on the shaft 26 and is maintained against longitudinal sliding movement on said shaft by collars 32 and 33 mounted and pinned to the shaft and respectively engaging the chamber 30 and the opposite end of the hub 28. Thus it will be seen that the pulley is permitted to have loose rotation at all times on the shaft 26 but cannot shift or become displaced from its desired position longitudinally of the shaft. The projecting end 29 of the hub 28 is formed with clutch teeth 34 to engage corresponding teeth 35 of a clutch 36 longitudinally shiftable on the shaft 26 through the medium of a feather key 37 engaging the same and the shaft. The end of the clutch 36 adjacent to toothed end of the hub 28 is also provided with a chamber 38, and in the chambers 30 and 38 a spring 39 is disposed and surrounds the shaft 26 and operates to for the clutch 36 away from the hub 28. When the clutch 36 is shifted into engagement with the hub 28, the spring 39 is compressed, and when the shifting pressure on the clutch 36 is relaxed the spring promptly acts to disengage the clutch and hub teeth. A brake collar 40 with a beveled periphery is carried by the inner end of the clutch 36, said brake collar operating in a stationary cone cup 41 secured to one of the adjacent cross-timbers 25. The inner end of the shaft 26 has a pinion 42 keyed thereon and held in continual mesh with a crank gear 43 mounted on a shaft 44 having bearing on the same timbers 25 at the center of the latter. The gear 43 has a wrist or analogous pin 45 thereon engaged by a pitman 46 which is also movably connected to the plunger, as shown by Fig. 1. On the shaft 44 a face cam 46$^a$ is secured and formed with a single drop or depression 47, see Fig. 9, this cam maintaining the engagement of the clutch 36 with the hub 28 to cause a full stroke of the packer plunger and foot or platen. Adjacent to cam 46$^a$ and secured on one of the timbers 25 are bearing brackets 48 in which a shifter or rock shaft 49 is mounted and has a pair of shifting arms 50 fixed to move therewith and engaging the clutch 36. This rock shaft 49 also has a roller arm 51 secured thereto and provided with a roller 52 at its free end and continually engaging the face cam 46$^a$. The rock shaft 49 is further provided with an actuating lever 53 having an upper flattened end, or has secured to or formed therewith a flat contact plate 54, the lever 53 having a normal angle of inclination toward the end of the frame supporting the separator 6. When the lever 53 is thrown inwardly it shifts or rocks the shaft 49 and simultaneously moves the arms 50 to shift the clutch 36 into engagement with the drive pulley hub 28 to connect and operate the plunger and its foot or platen with the drive mechanism through the shaft 26 and pinion 42 which actuates the gear 43, and through the medium of the pitman 46 the plunger and foot or platen are in turn set in motion.

Figure 2:
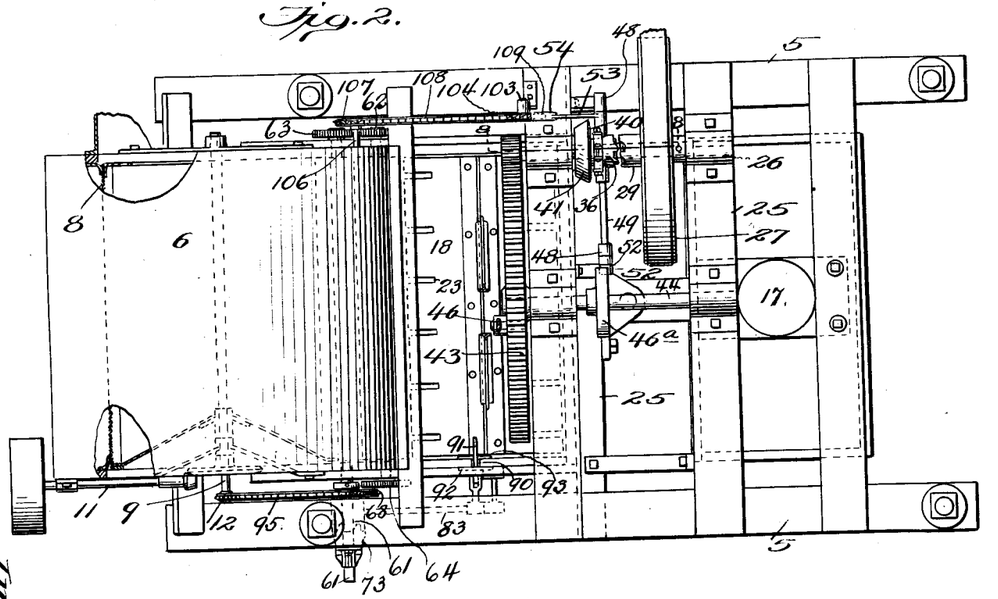
Fig. 2 is a top plan view of the mechanism.

The receiving chamber 10 of the separator 6 has a lower outlet opening 55 which continues through the adjacent wall of the delivery chamber 14 or the upper portion of the baling organization, and projecting into said outlet opening 55 are two feed rollers 56 and 57 respectively having shafts 58 and 59, the roller 56 being vertically superposed over and in normal contact with the lower roller 57. A third roller 60 is included in the group of feed rollers and is also provided with a shaft 61 and located in the lower portion of the chamber 10, the shaft 61 and roller 60 being so disposed that the roller will normally contact with the upper roller 56 and extend across the horizontal plane of the bite of the two rollers 56 and 57, the bite between rollers 56 and 60 being in a downwardly and inwardly inclined plane toward the roller 57. The rollers 56 and 60 take up the space, in both transverse and longitudinal directions, at the lower portion of the chamber 14. The shafts of the rollers 56 and 60 are extended through the rear side of the chamber 10 and provided with intermeshing pinions 62 and 63, the shaft 61 of roller 60 being the driving shaft for shaft 58 of roller 56, and all of the shafts 58, 59 and 61 extend through the front side of the chamber 10 and the shafts 58 and 59 have front pinions 64 and 65 normally in mesh. It will be seen that the motion of the roller 56 is transmitted, therefore, to the roller 57, and all the rollers are so geared that they will rotate in the proper direction to feed the cotton therethrough from the chamber 10. The shaft 61 is projected a greater distance outwardly at the front of the chamber 10 than the remaining roller shafts 58 and 59, as shown by Fig. 2, and said shaft 61 is especially equipped with operating and motion controlling means, as clearly illustrated by Fig. 6.

Loosely mounted on a sleeve bushing 66 on the shaft 61 is the hub 67 of a sprocket wheel 68, the said hub being projected from the outer side of the sprocket wheel and formed with a chamber 69 and terminal teeth 70. The sprocket 68 is held against longitudinal movement on the shaft by collars 71 and 72 pinned to the shaft and respectively engaging the inner end of the hub 67 and the inner terminal wall of the chamber 69. A clutch 73 is held on the shaft 61 to rotate with the latter by a feather key 74 and has inner teeth 75 to engage the teeth 70 of the hub 67 and with a hollow chamber 76 in its inner end to register with the chamber 69. In the chambers 69 and 76 a spring 77 is mounted and surrounds the shaft 61, said spring operating to force the clutch 73 outwardly from engagement with the sprocket wheel hub 67 when the clutch is relieved of clutching pressure. A clutch shifting yoke 78 engages opposite portions of the clutch 73 and has an upwardly projecting arm 79 fulcrumed on the adjacent timber, and a lower arm 80 connected by a link 81 to a depending crank arm 82 of a shifter or rock shaft 83. An angle iron or other suitable support 84 is fixed to and extends outwardly from the bottom of the chamber 10 below the shaft 61 and has a stop pin 85 to limit the outward throw of the clutch yoke 78 through engagement therewith of the lower arm 80. A bearing 86 is mounted on the angle iron or support 84, and on the lower portion of the adjacent side of the delivery chamber 14 a bearing bracket 87 is secured, the shifter or rock shaft 83 being mounted in said bearing 86 and bearing bracket 87, as shown more clearly by Fig. 1. Near the bearing bracket 87 the shifter or rock shaft 83 has an upwardly projecting crank arm 88 which is movably connected to the lower end of a vertically disposed trip bar 89 disposed in a slot 90 in the adjacent wall of the delivery chamber 14 and extending through the upper edge of said wall, all as shown by Figs. 1 and 10. The upper end of the bar 89 is formed as a goose-neck 91 which extends inwardly in transverse relation to and over a portion of the top of the foot or platen 18 and terminally strikes the horizontal or base portion of the iron 19 when the foot or platen 18 rises to normal elevated position. The bar 89 works freely in the slot 90 and is retained vertically or upright by keeper plates 92 and 93 respectively secured to the outer intermediate and upper inner portions of the adjacent side wall of the chamber 14. The bar 89 has a lower outwardly projecting end 94 to which the crank arm 88 is secured. When the foot or platen 18 rises, it strikes the terminal of the goose-neck 91 which always remains in the plane of movement of said foot, and the bar 89 is drawn upwardly a short distance with the foot or platen, thereby pulling the crank arm 88 in an outward and upward direction and rocking the shaft 83 outwardly, the latter shaft by such outward movement throwing the crank arm 82 outwardly and forcing the lower arm 80 of the clutch yoke 78 in a similar direction through the link 81 and shifting the clutch 73 inwardly into engagement with the hub 67 of the continually running sprocket wheel 68 against the resistance of the spring 77 which is compressed in the chambers 69 and 76. When the clutch 73 has thus been thrown into engagement with the sprocket wheel 68, the feed rollers 56, 57 and 60 are instantly set in motion and feed the cotton from the chamber 10 into the delivery chamber 14, and from the latter the cotton in bat form is regularly deposited in the bale box beneath said chamber 14. The sprocket wheel 68 is engaged and continuously driven by a chain belt 95 also trained over the sprocket wheel 12 on the shaft 9 of the cylinder 8 of the separator, and said sprocket wheels are so proportioned that a proper speed of rotation will be imparted to the feed rollers 56, 57 and 60 relatively to the speed of the cylinder or drum 8 effecting a deposit of the lint cotton in the chamber 10 on said rollers.

Figures 4, 5, 6:
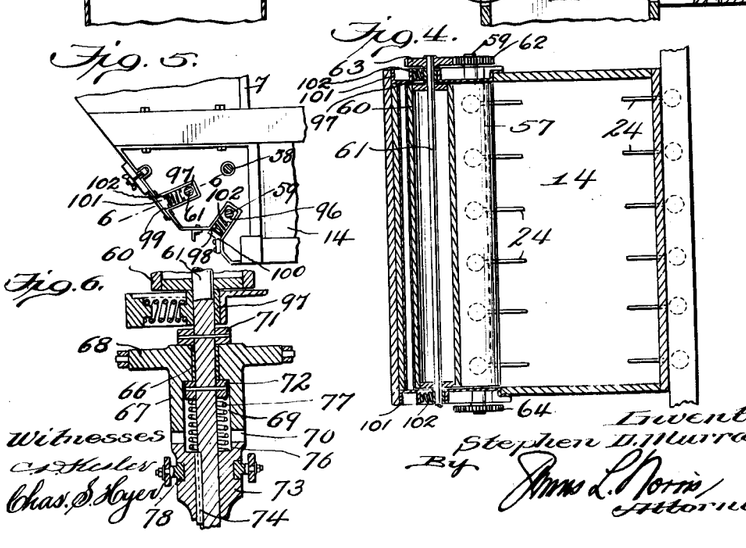
Fig. 4 is a horizontal section taken in the plane of the line 4—4, Fig. 3.
Fig. 5 is a detail view of the lower portion of the outlet chamber of the condenser or separator with the feed roller shafts in section and particularly illustrating the automatically adjustable bearings for a portion of the feed rollers.
Fig. 6 is a detail section on an enlarged scale and taken in the plane of the line 6—6, Fig. 5.
Figure 7:
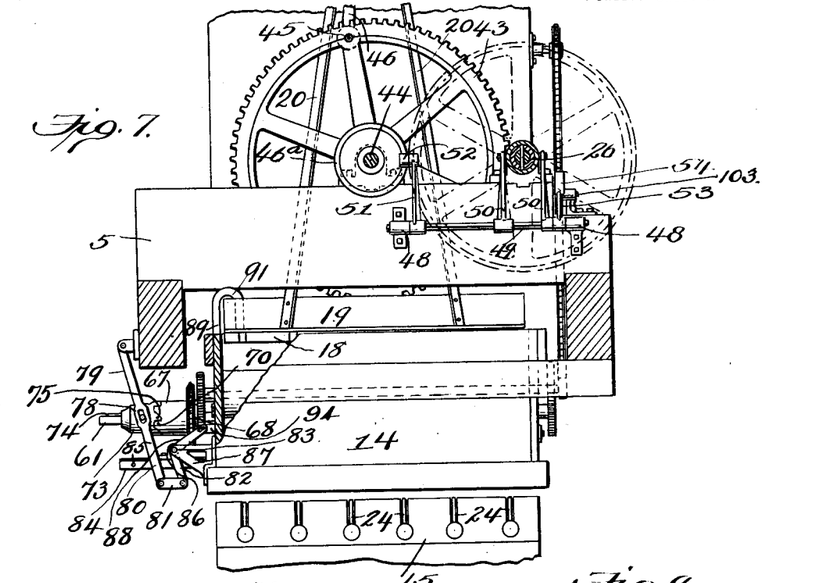
Fig. 7 is an end elevation of a portion of the mechanism partially broken away and in section and particularly illustrating the devices for automatically controlling the operation of the packer plunger and foot or platen and the feed rollers.

As shown by Figs. 3, 4 and 5, the shafts 59 and 61 of the rollers 57 and 60 are mounted in bearings 96 and 97 slidingly disposed in slots 98 and 99 formed in the front and rear walls of the chamber 10 and opening downwardly through the lower edges of said walls. The slots 98 and 99 have a downward and outward diverging relation to each other and have lower removable closures 100 and 101. Between the closures 100 and 101 and the bearings 96 and 97 of the respective shafts 59 and 61, springs 102 are inserted and tend to force said shafts inwardly and upwardly to bring the rollers 57 and 60 in the normal position shown by Fig. 3. Spring bat forming tension is thus always exerted on the rollers 57 and 60, and the latter automatically compensate for the thickness of the cotton bat formed thereby and maintain the bat of practically uniform thickness, and at the same time the said rollers are always caused to move inwardly or to assume their normal position relatively to the roller 58 having a fixed plane of rotation. The outward and downward movement of the roller 60 does not interfere with the operation of the chain belt 95, as the slots 99 for the bearings 97 of the shaft 61 of said roller are so disposed relatively to the shaft 9 and sprocket wheel 12 that a regular arc is described by the said chain belt and the roller 60 is thereby at all times regularly driven from the shaft 9 when the sprocket wheel 68 is clutched to the shaft 61. The intermeshing pinions of the shafts 58, 59 and 61 have teeth of such length as to permit automatic movement of the rollers 57 and 60 without inoperatively disengaging said pinions.

Adjacent to the actuating lever 53 a rearwardly projecting stub shaft 103 is supported by one of the timbers 25 and has a guide sprocket wheel 104 thereon. On the rear end of the shaft 58 of the upper roller 56 a small sprocket wheel 105 is keyed to rotate with said shaft, and extending outwardly from the upper portion of the rear wall of the separator 6 is a stub or bracket shaft 106 having a guide sprocket wheel 107 loose thereon. Trained over the sprocket wheels 104, 105 and 107 is a chain belt 108 having one link thereof provided at a predetermined point in the length of the belt with a trip projection 109 which strikes the plate or flattened end 54 of the lever 53 at intervals and throws said lever inwardly from its outward normally inclined position and actuates or rocks the shifter 49 to shift the clutch 36 through the arms 50 into engagement with the hub 28 of the drive pulley 27, and also to throw the roller arm 51 inwardly and disengage the roller 52 from the drop or depression 47 of the face cam 46, and is held in engagement with the cam edge of said cam during one whole cycle of the latter and the full down and up stroke of the plunger and its foot. The movement of the clutch 36 into engagement with the hub 28 of the drive pulley 27 withdraws the brake collar 40 from the cone cup 41 and freedom of operation of the driving mechanism relatively to the packer plunger and its foot results.

The projection 109 passes the end 54 of the actuating lever 53 and continues its circuit at a proper timed interval or when motion is again given to the chain belt, the rapidity of engagement of the chain projection with the actuating lever 53 being regulated by adjusting the length of the chain belt 108. When the foot 18 descends, the goose-neck 91 of the bar 89 is disengaged and immediately the spring 77 operates to release the clutch 73 from the hub 67 of the sprocket wheel 68, and the rollers 56, 57 and 60 cease to feed and the chain belt 108 remains stationary until the foot 18 ascends and again clutches the sprocket wheel 68 to the shaft 61, when the said rollers will again rotate and feed cotton into the delivery chamber 14 and the bale box thereunder, and the chain belt 108 will be regularly actuated until the projection again strikes and passes the end 54 of the actuating lever 53 when the plunger and its foot again descends and the feed of the cotton ceases. When the plunger and foot rise to maximum height the brake devices explained check any tendency to further movement thereof, and the parts are so arranged that when said brake devices operate the pin of the crank gear and the crank arm connected to the plunger will be in such position that an immediate operative response of the plunger and foot to the reciprocating mechanism therefor will ensue without any tendency to lock or jam on dead center for instance.

From the foregoing description the operation of the improved mechanism will be readily understood. The cotton is deposited in the chamber 10 in regular quantities or continuously by the cylinder or drum 8 in proportion to the feed of lint cotton through the lint flue connected to the separator, and while the rollers 56, 57 and 60 are rotating to feed the cotton from the chamber 10 into the baling apparatus the said chamber will be rapidly relieved of cotton falling upon the rollers 56 and 60, and the rollers will continue to feed the cotton from the chamber 10 into the delivery chamber 14 and thence into the bale box below until a certain quantity of the cotton has been deposited in the bale box and the plunger and its foot then descend by the automatic operation hereinbefore explained and press the cotton below the dogs of the bale box, and during this time the feed rollers are inactive the lint cotton accumulates in the chamber 10 on the rollers 56 and 60, and when the plunger and foot rise to a maximum elevation the feed rollers are again set in motion and owing to the position of the bite of the several rollers and also in view of the fact that the rollers 56 and 60 practically form the bottom of the chamber 10 the cotton having accumulated in the said chamber 10 will be quickly engaged by the rollers 56 and 60 and then by the rollers 56 and 57 and fed in bat form into the delivery chamber 14 without liability of choking and insuring the formation of a bat of uniform thickness which is materially advantageous in preliminarily packing the cotton in bale boxes. After the one bale box has become filled it is swung around under the baling plunger or ram 17 and replaced by an empty bale box in which the operation of packing is again pursued in accordance with the features of this invention.

From the foregoing description the invention will be understood as contemplating the placement of a pair of the group of rollers at the lower portion of the chamber 10 in such manner that the bite of the said pair of rollers is always in line with the direction of deposit of the cotton from the separator or condenser cylinder 8 thereon, or, the bite of said rollers will always be fully exposed to the cotton falling thereon. By this means the accumulated cotton in the chamber 10 on the pair of receiving rollers will be regularly drawn between said receiving rollers and thence pass laterally between one of the said pair of rollers and the remaining roller to feed the cotton from the chamber 10 with a discharging operation. When the term "feed" is used in the foregoing description and applied to the rollers in the bottom of the chamber 10, the meaning intended is that said rollers are feed means relatively to the baling apparatus and operate to feed the said apparatus by discharging the cotton from the said chamber 10. The rollers 56 and 57 which are disposed in the outlet or delivery opening 55 and form part of the wall between the chamber 10 and the baling apparatus, and the delivery chamber 14 constitutes a part of or a directing hopper-like device for the baling apparatus, but so far as the actual intent and purpose of the rollers in the bottom of the chamber 10 are concerned, said rollers constitute a direct discharge means between the chamber 10 and the baling apparatus without intervening structure. Where intervening structure in the form of a cotton receiving housing or chamber is applied to the outlet of the condenser and provided with auxiliary bat forming discharge rollers in an outlet thereof at a distance from the bat forming rollers of a condenser, the batted cotton discharged by and from the condenser rollers into said housing or inclosure, and intended to be regularly discharged into the baling apparatus by the auxiliary discharge rollers of the housing or chamber, will always be liable to crowd and choke in the said housing or chamber, and the bat will become broken and the auxiliary discharge rollers will be unable to pick up and continue to discharge the cotton to the baling apparatus until the choke is manually rectified. The present improved structure provides for a direct discharge and deposit of the batted cotton from the accumulating chambers of the condenser or separator into some portion of the baling apparatus, and a regular outlet or discharge of the cotton from the condenser into the baling apparatus is always insured in an automatic manner without liability of choking the discharge, breaking the bat or overflowing the inlet of the baling apparatus.

What is claimed is:

1. In a filler and packer for baling presses, a cotton supply means having a lint cotton accumulating and feeding chamber at its lower portion into which the loose cotton gravitates, the inner wall of said chamber being provided with an outlet, rotary feeding means operatively associated with and partially located in the chamber outlet and receiving the lint cotton thereon within the chamber, a packer movable adjacent to said outlet and feeding means, and mechanisms for intermittently and alternately operating the feeding means and packer whereby when the packer is acting the lint cotton will be temporarily stored in the said chamber.

2. In a filler and packer for baling presses, a cotton supply means having a lint cotton accumulating and feeding chamber at its lower portion into which the loose cotton gravitates, the inner wall of said chamber being provided with an outlet, movable feeding means operatively associated with the chamber outlet and receiving the lint cotton thereon within the chamber, a packer adjacent to said outlet and feeding means and having a movement independent of the movement of the feeding means, and mechanism for alternately and intermittently operating the feeding means and packer whereby when the packer is active the feeding means will be inactive and cause lint cotton to be temporarily stored in said chamber.

3. A baling apparatus including a bale box, a reciprocating packing means coöperative with said apparatus, a lint cotton receiving chamber having a wall with an outlet opening therein communicating with a portion of the baling apparatus, and feed rollers at the lower extremity of the said chamber and extending over the bottom of the latter and also partially projecting into the said feed opening, the lint cotton falling upon the said rollers and delivered through the outlet opening by said rollers.

4. A baling apparatus, a reciprocating packing means coöperating with said apparatus, a lint cotton receiving chamber having an outlet opening communicating with a portion of the baling apparatus, and feed rollers in the lower portion of and fully taking up the space of the chamber in which they are located and also projecting partially into the outlet opening and directly exposed to the portion of a baling apparatus with which the outlet opening communicates, the lint cotton falling upon said rollers and delivered laterally by the rollers through the outlet opening.

5. A baling apparatus, a reciprocating packing means coöperating with said apparatus, a lint cotton receiving chamber having communication at its lower portion with a part of the baling apparatus, and feed rollers at the lower extremity of the said chamber and extending into the point of communication of the chamber with the baling apparatus and directly exposed to a part of said apparatus, the lint cotton being deposited upon the said rollers.

6. A baling apparatus, a reciprocating packing means coöperating with said apparatus, a lint receiving chamber opening into a portion of the baling apparatus, and feed rollers in and forming the bottom portion of the said chamber and in part directly exposed to the baling apparatus through the opening between the latter and the chamber.

7. A baling apparatus, a reciprocating packing means coöperating with the said apparatus, a lint cotton receiving chamber having communication with a portion of the apparatus, and feed rollers mounted in and covering the lower portion of the chamber and forming means for directly receiving the deposit of lint cotton in the chamber above the bottom of the latter, the said rollers being in part exposed to the baling apparatus through the point of communication of the chamber therewith.

8. A baling apparatus, a reciprocating packer therefor, mechanism for automatically causing the packer to reciprocate at intervals into and outwardly from the baling apparatus, and a cotton supply means having a lower chamber provided with feed rollers for delivering the cotton into the baling apparatus, the feed rollers forming a covering for the lower portion of the chamber and having means operatively associated therewith and with the said mechanism to effect a cessation of operation of said rollers during the reciprocation of the packer.

9. A lint cotton supply means having a chamber at the lower portion thereof provided with an outlet in the inner side wall, feed rollers disposed in the bottom of said chamber adjacent to the outlet and in part having a fixed operative position and in part having a shiftable operative position, and a packer movably associated with said chamber.

10. A baling apparatus, a reciprocating packer coöperating with said apparatus, a lint cotton receiving chamber communicating with the baling apparatus, and a series of triangularly arranged feed rollers in the said chamber at the point of communication of the latter with the baling apparatus.

11. A baling apparatus, a reciprocating packer coöperating with said apparatus, a lint cotton receiving chamber communicating with the baling apparatus, and a series of triangularly arranged feed rollers in the said chamber at the point of communication of the latter with the baling apparatus, the one feed roller having a fixed plane of rotation and the remaining rollers automatically shiftable with relation to each other and to the roller having the fixed plane of rotation.

12. A baling apparatus, a reciprocating packer coöperating with said apparatus, mechanism for causing the packer to cease operation after one full stroke thereof relatively to the baling apparatus, a cotton supply inclosure having an outlet, and rotary means in the outlet of said inclosure for feeding cotton directly into the baling apparatus from the inclosure and provided with devices operatively connected to the said mechanism for causing the said rotary feeding means to operate only when the packer is at rest.

13. A baling apparatus, a cotton packer having a packing movement inwardly into and outwardly from said apparatus, a lint receiving chamber located close to the baling apparatus and having direct communication with the baling apparatus, and means at the point of communication of the chamber with the baling apparatus for drawing off the lint cotton from the chamber and positively and directly feeding the lint cotton from said chamber into the baling apparatus below the packer.

14. A baling apparatus, a reciprocating packer coöperating with said apparatus, a lint receiving chamber communicating with the baling apparatus, and feed rollers in the said chamber adjacent to the point of communication of the latter with the apparatus, the feed rollers having engagement with each other and part of the rollers shiftable automatically with relation to a remaining portion thereof.

15. A baling apparatus including a bale box, a packing means coöperating with said apparatus, a lint receiving and accumulating chamber with an outlet opening directly into a portion of the baling apparatus, and discharging rollers at the lower portion of said chamber on which the cotton is vertically deposited and having the bite thereof in the direction of the deposit of the cotton thereon.

16. A baling apparatus including a bale box, a packing means coöperating with said apparatus, a lint receiving and accumulating chamber with a lower outlet opening directly into a portion of the baling apparatus, and a group of discharging rollers at the lower portion of said chamber, a portion of said rollers being arranged in the chamber outlet and forming a part of the wall between said chamber and baling apparatus, a pair of said rollers being disposed to have the cotton deposited thereon, and their bite in line with the deposit of the cotton thereon, one of said pair of rollers and another roller having a bite at an angle to the bite of said pair of rollers.

In testimony whereof I have hereunto set my hand in presence of two subscribing witnesses.

STEPHEN D. MURRAY.

Witnesses:
 CHAS. S. HYER,
 SADIE STANFORD WHITE.